(12) United States Patent
Konishi et al.

(10) Patent No.: US 6,181,881 B1
(45) Date of Patent: *Jan. 30, 2001

(54) FIELD-OF-VIEW FRAME SWITCHING DEVICE

(75) Inventors: Yoshito Konishi, Sakai; Yoshiyuki Inoue, Izumi, both of (JP); Wong Ngai Kit, Petaling Jaya (MY)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/201,825

(22) Filed: Dec. 1, 1998

(30) Foreign Application Priority Data

| Dec. 2, 1997 | (JP) | 9-331361 |
|---|---|---|
| Dec. 2, 1997 | (JP) | 9-331479 |

(51) Int. Cl.[7] .............................. G03B 13/10; G03B 17/00
(52) U.S. Cl. ..................... 396/378; 396/380; 396/435; 396/436
(58) Field of Search ................... 396/378, 380, 396/435, 436

(56) References Cited

U.S. PATENT DOCUMENTS

| 2,247,104 | * | 6/1941 | Takacs | 396/380 |
| 3,356,003 | * | 12/1967 | Eckhardt | 396/377 |
| 3,619,202 | * | 11/1971 | Bellows | 396/378 |
| 4,931,818 | * | 6/1990 | Gates | 396/378 |
| 5,500,704 | | 3/1996 | Kawano | 396/380 |
| 5,539,489 | * | 7/1996 | Yamamoto | 396/437 |
| 5,592,252 | * | 1/1997 | Kobayashi et al. | 396/380 |
| 5,602,606 | * | 2/1997 | Yazawa | 396/435 |
| 5,732,297 | * | 3/1998 | Tanaka et al. | 396/380 |
| 5,828,914 | * | 10/1998 | Balling | 396/378 |

FOREIGN PATENT DOCUMENTS

| 06273826 | 9/1994 | (JP) . |
| 08146493 | 7/1996 | (JP) . |

* cited by examiner

*Primary Examiner*—Eddie C. Lee
(74) *Attorney, Agent, or Firm*—McDermott, Will & Emery

(57) ABSTRACT

A field-of-view frame switching device has a rectangular fixed field-of-view frame and a plurality of light-shielding members for covering portions of the rectangular fixed field-of-view frame so as to vary the size of the actual field-of-view frame. The light-shielding members are composed of a first pair of oppositely arranged light-shielding members and a second pair of oppositely arranged light-shielding members. The field-of-view frame switching device also has a coupling member for coupling the light-shielding members together in such relation that, when the first pair of light-shielding members are positioned closer to each other to narrow the actual field-of-view frame, the second pair of light-shielding members are positioned wide apart from each other and that, when the first pair of light-shielding members are positioned wide apart from each other, the second pair of light-shielding members are positioned closer to each other to narrow the actual field-of-view frame. The field-of-view frame switching device further has a moving member for moving at least a part of the light-shielding members in a direction substantially parallel to one side of the rectangular fixed field-of-view frame.

15 Claims, 15 Drawing Sheets

FIELD-OF-VIEW FRAME SWITCHING DEVICE

This application is based on applications Nos. H09-331479 and H09-331361 filed in Japan, the content of which is hereby incorporated by reference.

BACKGROUND OF THE INVENTION

1. Field of the Invention

The present invention relates to a field-of-view frame switching device, and more particularly to a device for switching the field-of-view frame of a viewfinder designed for the Advanced Photo System, which uses three picture formats.

2. Description of the Prior Art

In recent years, more and more products conforming to the Advanced Photo System (hereafter referred to as the "APS") have been introduced to the market. The APS uses three picture formats to allow an image to be taken in one of the following three different frame sizes: the wide format (hereafter referred to as the "H format") that offers an aspect ratio of 9:16, the standard format (hereafter referred to as the "C format") that has the same vertical dimension as and a shorter horizontal dimension than the H format and offers an aspect ratio of 2:3, and the panorama format (hereafter referred to as the "P format") that has the same horizontal dimension as and a shorter vertical dimension than the H format and offers an aspect ratio of 1:3.

Typically, a user's selection of a specific frame size causes the switching of the field-of-view frame of a viewfinder. Conventional field-of-view frame switching devices are disclosed, for example, in Japanese Laid-Open Patent Applications Nos. H6-273826 and H8-146493. How these conventional devices achieve the switching of the field-of-view frame is schematically illustrated in FIGS. 1A to 1C and in FIGS. 2A to 2C respectively. Of these figures, FIGS. 1A and 2A show the arrangement of the field-of-view frame for the H format, FIGS. 1B and 2B show the same for the C format, and FIGS. 1C and 2C show the same for the P format.

Either of these devices has a fixed field-of-view frame 11 (indicated by broken lines) and two L-shaped movable masks 12 and 13. The vertical dimension of the C and H formats and the horizontal dimension of the H and P formats are determined by the fixed field-of-view frame 11. In each of the figures, the hatched area represents the frame size of the selected formats (H, C, or P).

In the device shown in FIGS. 1A to 1C, the two L-shaped movable masks 12 and 13 are individually moved horizontally (i.e. translated in the directions indicated by arrows C) to determine the horizontal dimension of the C format, and they are moved vertically (i.e. translated in the directions indicated by arrows P) to determine the vertical dimension of the P format. By contrast, in the device shown in FIGS. 2A to 2C, the two L-shaped movable masks 12 and 13 are individually moved obliquely (i.e. translated in the directions indicated by arrows C or P) to determine the horizontal dimension of the C format or the vertical dimension of the P format.

However, allowing the movable masks to be moved in both horizontal and vertical directions requires not only a complicated driving mechanism but also an ample space for it. On the other hand, allowing the movable masks to be moved in oblique directions requires a simpler driving mechanism, since they need to be driven along only one axis, but requires them to be driven over a comparatively long movement stroke (see FIGS. 2B and 2C). Thus, both of these devices have been imposing various restrictions in the design of compact cameras.

SUMMARY OF THE INVENTION

An object of the present invention is to provide a device that makes it possible, in any photographing system including the APS, to select a field-of-view frame of a viewfinder from among a plurality of choices and that nevertheless requires only a minimal movement stroke of movable masks and a minimal space for a driving mechanism.

To achieve the above object, according to one aspect of the present invention, a field-of-view frame switching device is provided with a rectangular fixed field-of-view frame and a plurality of light-shielding members for covering portions of the rectangular fixed field-of-view frame so as to vary the size of the actual field-of-view frame. Here, the light-shielding members are composed of a first pair of oppositely arranged light-shielding members and a second pair of oppositely arranged light-shielding members. This field-of-view frame switching device is provided also with a coupling member for coupling the light-shielding members together in such relation that, when the first pair of light-shielding members are positioned closer to each other to narrow the actual field-of-view frame, the second pair of light-shielding members are positioned wide apart from each other and that, when the first pair of light-shielding members are positioned wide apart from each other, the second pair of light-shielding members are positioned closer to each other to narrow the actual field-of-view frame. This field-of-view frame switching device is provided further with a moving member for moving at least a part of the light-shielding members in a direction substantially parallel to one side of the rectangular fixed field-of-view frame.

According to another aspect of the present invention, a field-of-view frame switching device is provided with a rectangular fixed field-of-view frame and a plurality of field-of-view frame switching members for covering portions along the top, bottom, left-hand, and right-hand sides of the rectangular fixed field-of-view frame so as to vary the size of the actual field-of-view frame. This field-of-view frame switching device is provided also with a coupling member for coupling the field-of-view frame switching members together into a single unit.

According to still another aspect of the present invention, a field-of-view frame switching device is provided with a rectangular fixed field-of-view frame and a field-of-view frame switching member for covering portions of the rectangular fixed field-of-view frame so as to vary the size of the actual field-of-view frame. Here, the field-of-view frame switching member is divided at least at one side thereof. This field-of-view frame switching device is provided also with a moving member for moving the field-of-view frame switching member.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1A:
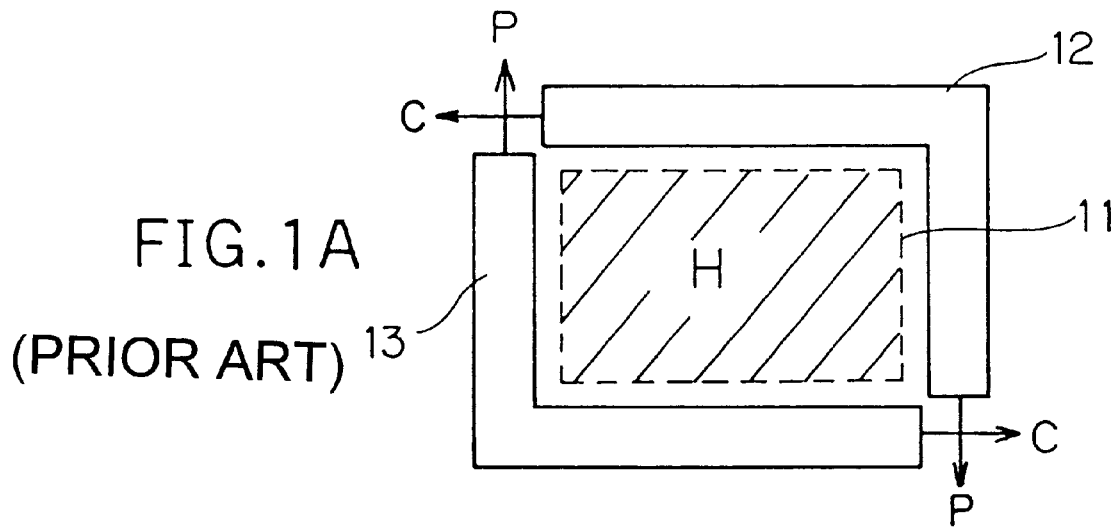
FIG. 1A is a diagram illustrating the arrangement of the field-of-view frame switching members in a first conventional example of a field-of-view frame switching device, when the H format is selected.
Figure 1B:
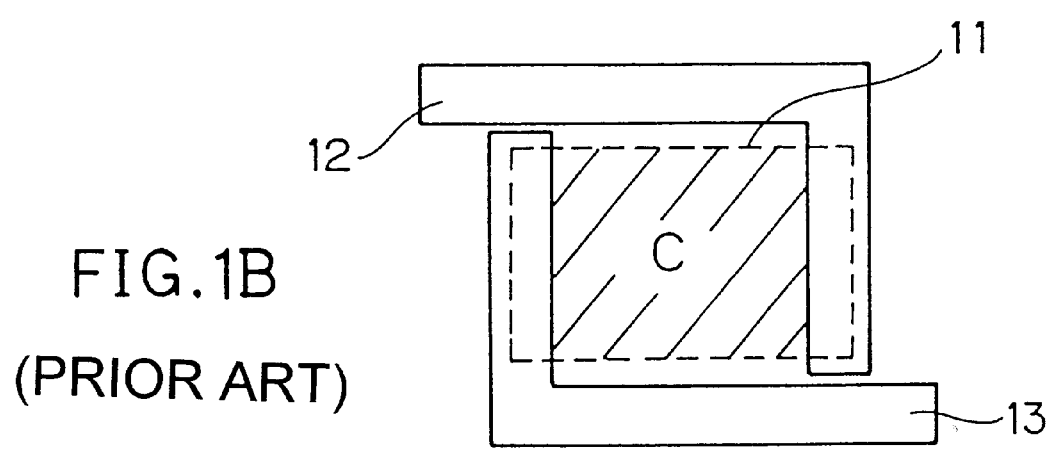
FIG. 1B is a diagram illustrating the arrangement of the field-of-view frame switching members in the first conventional example of a field-of-view frame switching device, when the C format is selected.
Figure 1C:
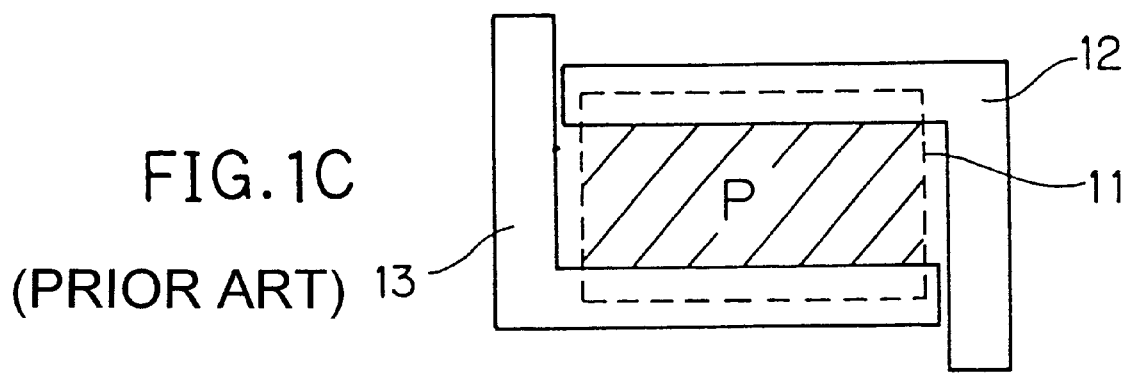
FIG. 1C is a diagram illustrating the arrangement of the field-of-view frame switching members in the first conventional example of a field-of-view frame switching device, when the P format is selected.
Figure 2A:
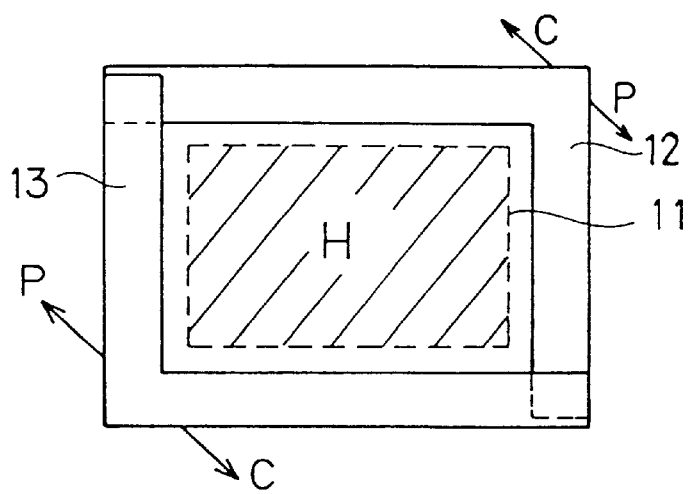
FIG. 2A is a diagram illustrating the arrangement of the field-of-view frame switching members in a second conventional example of a field-of-view frame switching device, when the H format is selected.
Figure 2B:
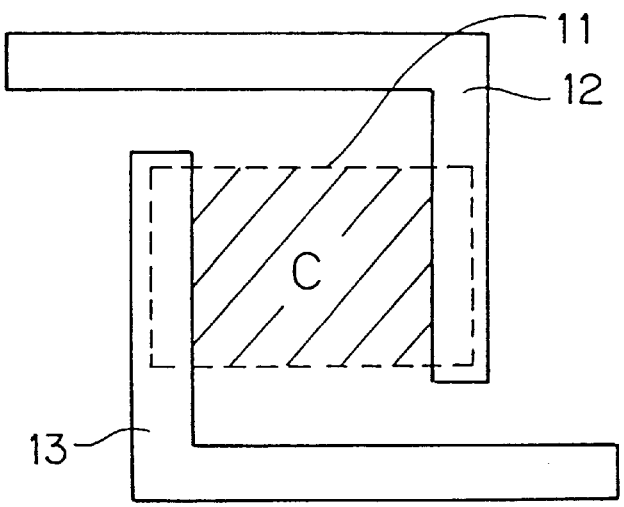
FIG. 2B is a diagram illustrating the arrangement of the field-of-view frame switching members in the second conventional example of a field-of-view frame switching device, when the C format is selected.
Figure 2C:
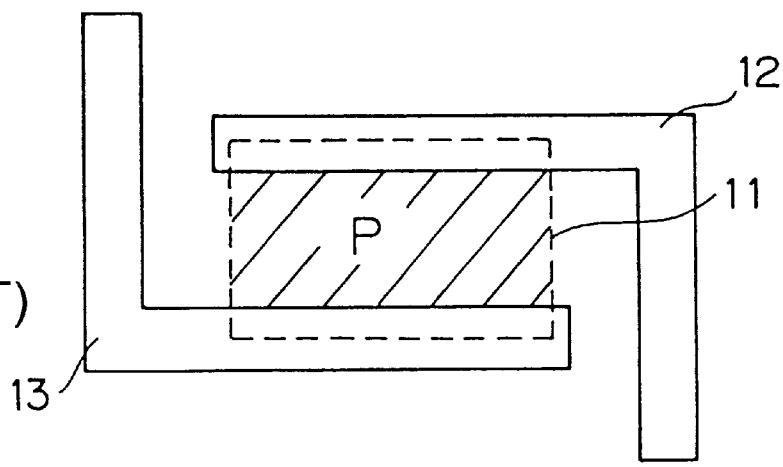
FIG. 2C is a diagram illustrating the arrangement of the field-of-view frame switching members in the second conventional example of a field-of-view frame switching device, when the P format is selected.
Figure 3:
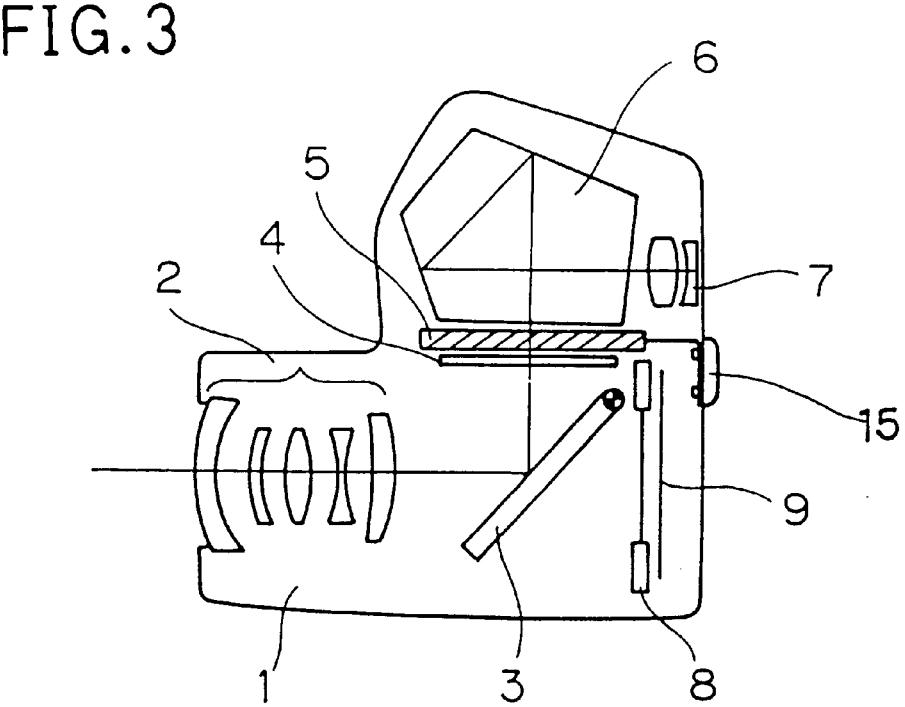
FIG. 3 is a sectional view of a camera incorporating the field-of-view frame switching device of a first embodiment of the invention.
Figure 4:
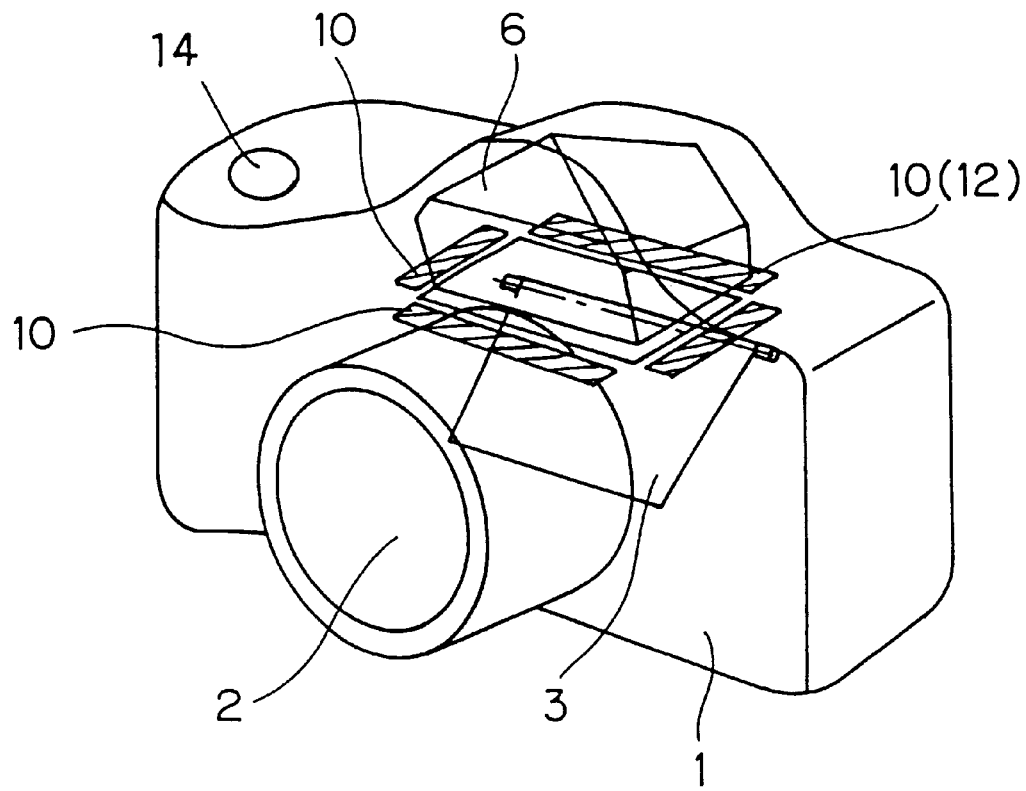
FIG. 4 is a perspective view of the camera incorporating the field-of-view frame switching device of the first embodiment.

The structure of a camera incorporating the field-of-view frame switching device of a first embodiment of the invention is shown in FIGS. 3 and 4. FIG. 3 shows a sectional view and FIG. 4 shows a perspective view of the camera 1.

The light beam coming from an object travels through a taking lens system 2, and is then reflected by a quick-return mirror 3 so as to be focused on a focusing screen 4 and form an image thereon. Closely behind the focusing screen 4 along the beam path is disposed a field-of-view frame switching unit 5. The light beam having passed through the field-of-view frame switching unit 5 is then reflected by a pentagonal roof prism 6 and directed to an eyepiece lens 7 so that the user of the camera can observe an image of the object.

When the user presses a release button 14, the quick-return mirror 3 rotates so that the light beam from the object will be directed straight to a film 9, and a shutter 8 disposed in front of the film 9 is released to achieve exposure. Note that, instead of the pentagonal roof prism 6, a pentagonal roof mirror may be used.

Although not shown, a fixed field-of-view frame is formed on the focusing screen 4. This fixed field-of-view frame determines the field-of-view frame for the H format. The field-of-view frame switching unit 5 is provided with a movable mask 12 having light-shielding wings 10 for shielding the field-of-view frame from four sides. When a field-of-view frame switching operation unit 15 is operated, appropriate ones of the light-shielding wings 10 are moved in an appropriate manner so that the field-of-view frame will be switched to that for the P or C format.

In the APS, when the images recorded on the film 9 are printed on photographic paper, appropriate frame sizes are selected in accordance with the information recorded on the film 9. Thus, in principle, partial shielding of the film 9 is unnecessary in the APS. However, in other systems such as the 135 system, switching between a standard frame size and a panorama frame size, for example, cannot be achieved unless a special mechanism for switching the frame size is provided in front of or behind the shutter 8.

Figure 5A:
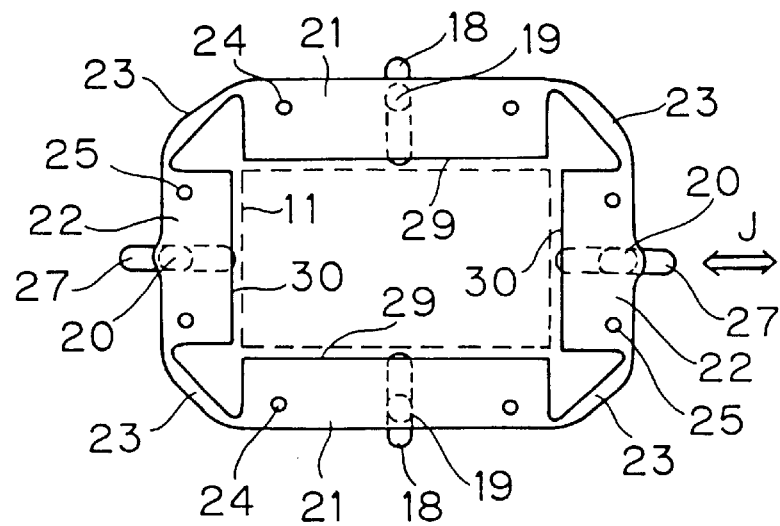
FIG. 5A is a diagram illustrating the arrangement of the light-shielding wings of the field-of-view frame switching device of the first embodiment, when the H format is selected.
Figure 5B:
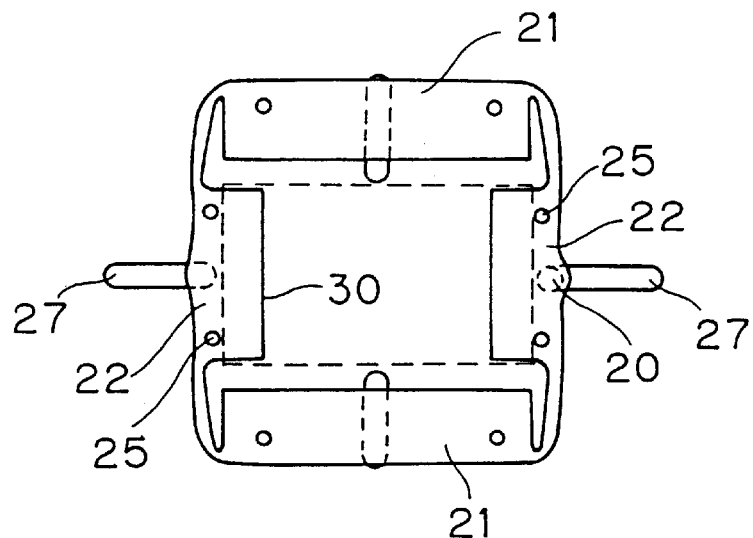
FIG. 5B is a diagram illustrating the arrangement of the light-shielding wings of the field-of-view frame switching device of the first embodiment, when the C format is selected.
Figure 5C:
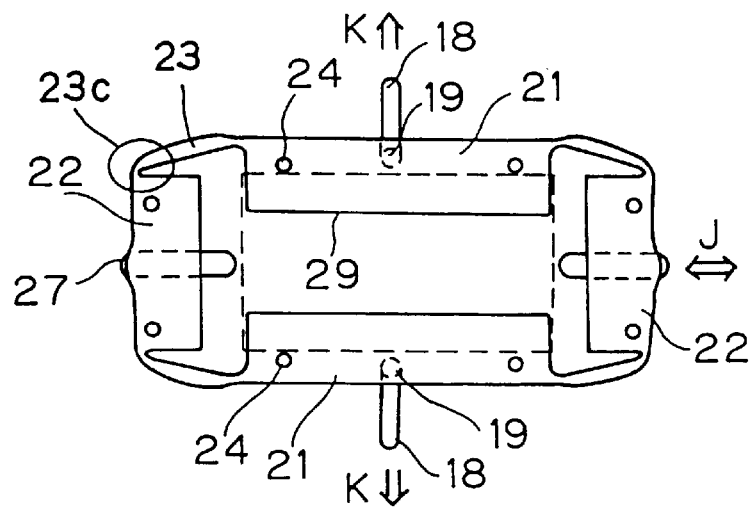
FIG. 5C is a diagram illustrating the arrangement of the light-shielding wings of the field-of-view frame switching device of the first embodiment, when the P format is selected.

Now, the movable mask 12 of the field-of-view frame switching device of the first embodiment will be described with reference to the drawings. FIGS. 5A, 5B, and 5C illustrate the arrangement of the light-shielding wings for the H, C, and P formats respectively.

The movable mask 12 includes four light-shielding wings, of which two will be referred to as the P light-shielding wings 21 and the other two as the C light-shielding wings 22. These P and C light-shielding wings 21 and 22 each have a boss 19 or 20 formed thereon, and each boss 19 or 20 is guided along a slide guide groove 18 or 27 so that the P and C light-shielding wings 21 and 22 can move vertically and horizontally (as seen in the figures) respectively.

The movable mask 12 as a whole is made of a flexible material, and is so shaped that the P and C light-shielding wings 21 and 22 are rigid enough to keep their field-of-view frame determining edges 29 and 30 straight at all times and simultaneously that the arm-like portions 23 connecting between the P and C light-shielding wings 21 and 22 are flexible enough to change their orientation freely. Alternatively, it is also possible to form the P and C light-shielding wings 21 and 22 out of one material and the arm-like portions 23 out of another material so that only the arm-like portions 23 may be made of a flexible material.

The P and C light-shielding wings 21 and 22 each have a stopper 24 or 25 formed thereon. The stoppers 24 and 25, by being struck against fixed members (not shown) provided near the corresponding sides of the fixed field-of-view frame 11, serve to position the field-of-view frame determining edges 29 and 30 in such positions where they determine the vertical dimension of the field-of-view frame for the P format and the horizontal dimension of the field-of-view frame for the C format respectively.

Having the structure as described above, the movable mask 12 appears as shown in FIG. 5A when the H format is selected. At this time, the bosses 19 and 20 are located substantially at the center of the slide guide grooves 18 and 27, and all of the P and C light-shielding wings 21 and 22 are located outside the fixed field-of-view frame 11.

When the frame size is switched from the H format to the C format, as shown in FIG. 5B, the bosses 20 are, by the action of a driving mechanism that will be described later, moved inward along the slide guide grooves 27, and thereby the C light-shielding wings 22, which are disposed opposite each other, are moved horizontally inward until the stoppers 25 strike against the fixed members (not shown) formed near the corresponding sides of the fixed field-of-view frame 11. Meanwhile, as the arm-like portions 23 become more and more vertically oriented, the bosses 19 are moved outward along the slide guide grooves 18, and thereby the P light-shielding wings 21 are moved vertically outward. In this way, the field-of-view frame for the C format is determined.

When the frame size is switched from the H format to the P format, as shown in FIG. 5C, the bosses 20 are, by the action of a driving mechanism that will be described later, moved outward along the slide guide grooves 27, and thereby the C light-shielding wings 22, which are disposed opposite each other, are moved horizontally outward. Meanwhile, as the arm-like portions 23 become more and more horizontally oriented, the bosses 19 are moved inward along the slide guide grooves 18, and thereby the P light-shielding wings 21 are moved vertically inward until the stoppers 24 strike against the fixed members (not shown) formed near the corresponding sides of the fixed field-of-view frame 11. In this way, the field-of-view frame for the P format is determined.

Figure 6A:
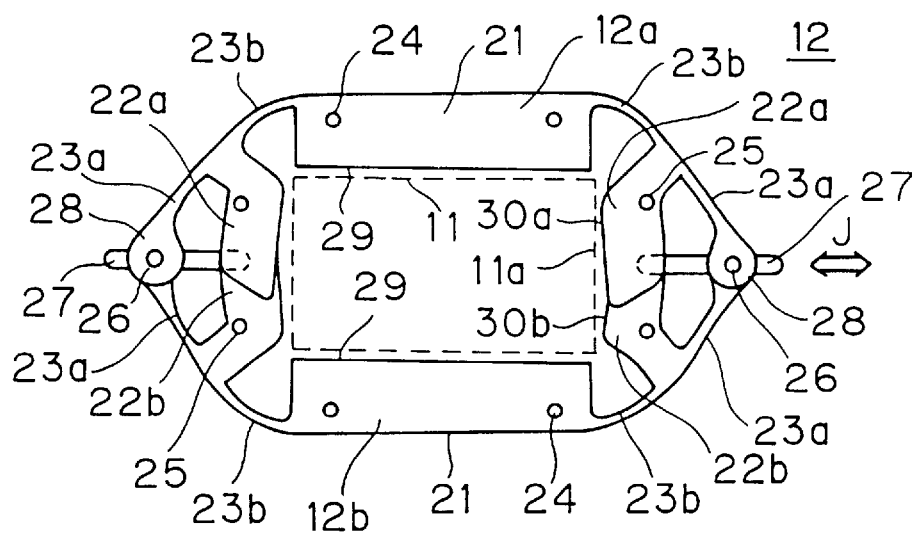
FIG. 6A is a diagram illustrating the arrangement of the light-shielding wings of the field-of-view frame switching device of a second embodiment of the invention, when the H format is selected.
Figure 6B:
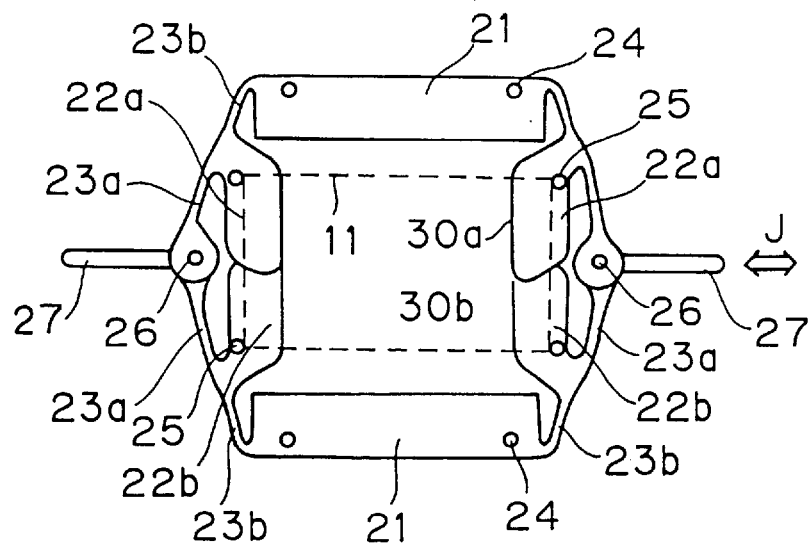
FIG. 6B is a diagram illustrating the arrangement of the light-shielding wings of the field-of-view frame switching device of the second embodiment, when the C format is selected.
Figure 6C:
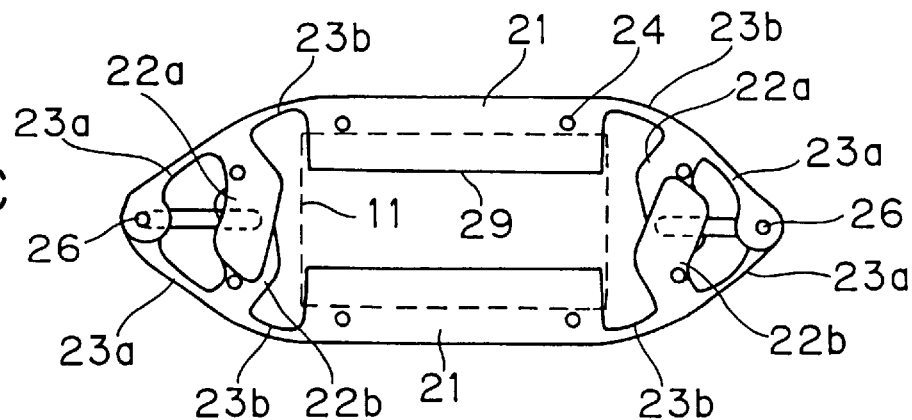
FIG. 6C is a diagram illustrating the arrangement of the light-shielding wings of the field-of-view frame switching device of the second embodiment, when the P format is selected.

Next, the field-of-view frame switching device of a second embodiment of the invention will be described with reference to the drawings. FIGS. 6A, 6B, and 6C illustrate the arrangement of the light-shielding wings for the H, C, and P formats respectively. Note that, in FIGS. 6A, 6B, and 6C, such components as are found also in FIGS. 5A, 5B, and 5C are identified with the same reference numbers.

In FIGS. 6A, 6B, and 6C, the movable mask 12 includes an upper mask portion 12a and a lower mask portion 12b, and these portions 12a and 12b are coupled together at two coupling portions 28 that are rotatably fitted around two slide shafts 26. The upper and lower mask portions 12a and 12b may be formed as two separate units that are later coupled together at the coupling portions 28, or alternatively may be formed as a single unit. The slide shafts 26 are guided along slide guide grooves 27 so that they can be moved, by a driving mechanism that will be described later, horizontally (as seen in the figures) in directions in which they recede from each other and approach each other.

Two P light-shielding wings 21 are disposed opposite each other, and are coupled to C light-shielding wings 22a and 22b (here, the right-hand and left-hand C light-shielding wings are each divided into an upper and a lower portion) by arm-like portions 23b. The C light-shielding wings 22a and 22b are coupled to the coupling portions 28 by arm-like portions 23a. The P light-shielding wings 21 and the C light-shielding wings 22a and 22b each have a stopper 24 or 25 formed thereon. The stoppers 24 and 25, by being struck against fixed members (not shown) formed near the corresponding sides of the fixed field-of-view frame 11, serve to position the P light-shielding wings 21 and the C light-shielding wings 22a and 22b respectively, in appropriate positions.

Having the structure as described above, the movable mask 12 appears as shown in FIG. 6A when the H format is selected. At this time, the slide shafts 26 are located substantially at the center of the slide guide 27, and all of the P and C light-shielding wings 21, 22a, and 22b are located outside the fixed field-of-view frame 11.

When the frame size is switched from the H format to the C format, as shown in FIG. 6B, the slide shafts 26 move inward along the slide guide grooves 27; meanwhile, the arm-like portions 23a and 23b are, as it were, folded up. As a result, the C light-shielding wings 22a and 22b move vertically away from each other, and meanwhile they move horizontally inward until the stoppers 25 strike the fixed members (not shown) formed near the corresponding sides of the fixed field-of-view frame 11. Even if the slide shafts 26 are moved further inward along the slide guide grooves 27, only the arm-like portions 23a change their rotation, and the C light-shielding wings 22a and 22b are kept in fixed positions by the stoppers 25.

At this time, the field-of-view determining edges 30 of the C light-shielding wings 22a and 22b form straight lines. On the other hand, the P light-shielding wings 21 are moved vertically away from each other by the C light-shielding wings 22a and 22b and the arm-like portions 23b so as to be retracted out of the fixed field-of-view frame 11. In this way, the field-of-view frame for the C format is determined.

When the frame size is switched from the H format to the P format, as shown in FIG. 6C, the slide shafts 26 move outward along the slide guide grooves 27; meanwhile, the arm-like portions 23a and 23b are, as it were, unfolded. As a result, the C light-shielding wings 22a and 22b move vertically closer to each other, and meanwhile they move horizontally outward. This causes the P light-shielding wings 21 to move vertically inward until the stoppers 24 strike the fixed members (not shown) formed near the corresponding sides of the fixed field-of-view frame 11. At this time, the field-of-view determining edges 29 of the P light-shielding wings 21 determine the field-of-view frame for the P format.

As shown in FIGS. 5A–5C and 6A–6C, coupling together the P light-shielding wings 21 and the C light-shielding wings by the use of flexible members (i.e. the arm-like portions 23) makes it possible to select a field-of-view frame from three or more choices by moving the oppositely arranged C light-shielding wings 22 in opposite directions along an axis substantially perpendicular to one side (11a) of the fixed field-of-view frame 11, with the C light-shielding wings 22 each driven at one point (i.e. the boss 20 or slide shaft 26) integral therewith.

This can be achieved by the use of a simple driving mechanism that can drive the relevant members along only one axis and with a minimum of space secured to allow the movement of the light-shielding wings. This leads to a significant reduction in the size of the field-of-view frame switching device as a whole. Note that the first embodiment permits a modification in which the bosses 19 are moved vertically (as seen in the figures). Note also that the second embodiment permits a modification in which the P light-shielding wings 21 are each divided into a right-hand and a left-hand portion and the slide shafts 26 are disposed beside the outer edge of each P light-shielding wing 21 so as to be moved vertically. Moreover, in the second embodiment, in which the field-of-view determining edges 29 of the P light-shielding wings 21 are always straight, it is also possible to provide an additional stopper mechanism somewhere between the H-format and P-format positions so as to make available another field-of-view frame for a format other than the H, C, and P formats.

In FIG. 5C, as the arm-like portions 23 become more and more parallel oriented with respect to the movement direction (indicated by arrows J) of the C light-shielding wings 22, the joint portions 23c between the C light-shielding wings 22 and the arm-like portions 23 shrink. Since the joint portions 23c are resilient, their shrinkage destabilizes the stoppers 24 for the P light-shielding wings 21 by predisposing them to move away from the fixed members (not shown), in the directions indicated by arrows K.

In the second embodiment, the C light-shielding wings 22a and 22b are each divided into an upper and a lower portion, and these portions move vertically (as seen in the figures) in opposite directions. As shown in FIG. 6C, when the P format is selected, the arm-like portions 23a and 23b form large angles with respect to the movement direction (indicated by arrows J) of the C light-shielding wings 22, and this helps keep the stoppers 24 securely against the fixed members (not shown). As a result, it is possible to obtain stable and accurate field-of-view frames and also realize smooth movement of the P light-shielding wings 21. For these reasons, it is preferable that the C light-shielding wings 22a and 22b be each divided into an upper and a lower portion.

Figure 7:
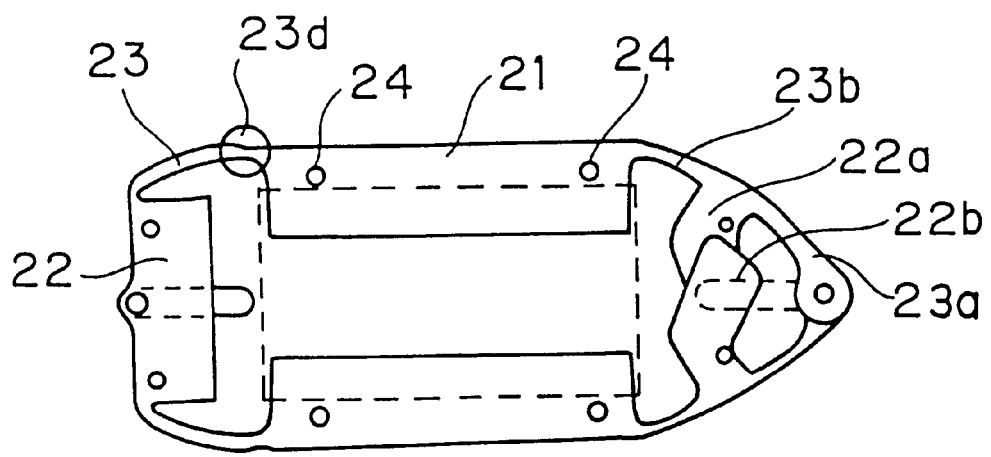
FIG. 7 is a diagram illustrating the arrangement of the light-shielding wings of the field-of-view frame switching device of a third embodiment of the invention, when the P format is selected.

Alternatively, as shown in FIG. 7, which illustrates the field-of-view frame switching device of a third embodiment of the invention, it is also possible to divide only one of the C light-shielding wings into two portions (22a and 22b). In this case, the arm-like portions 23a and 23b are made more rigid than the arm-like portion 23 or the joint portions 23d so as not to predispose the stoppers 24 to move away from the fixed members (not shown).

Figure 8A:
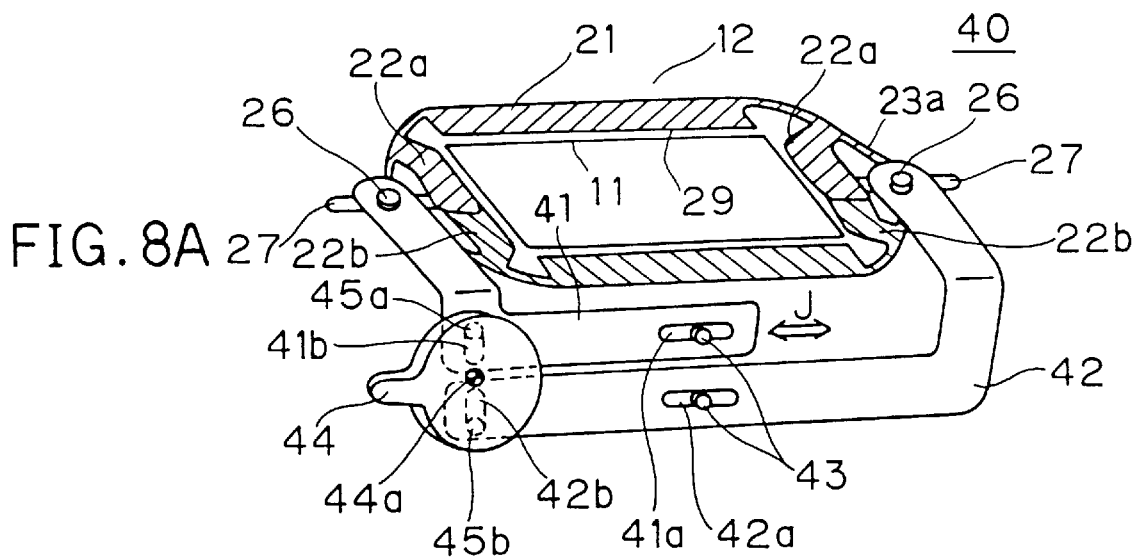
FIG. 8A is a perspective view of the driving mechanism of the field-of-view frame switching device of the first to third embodiments.
Figure 8B:
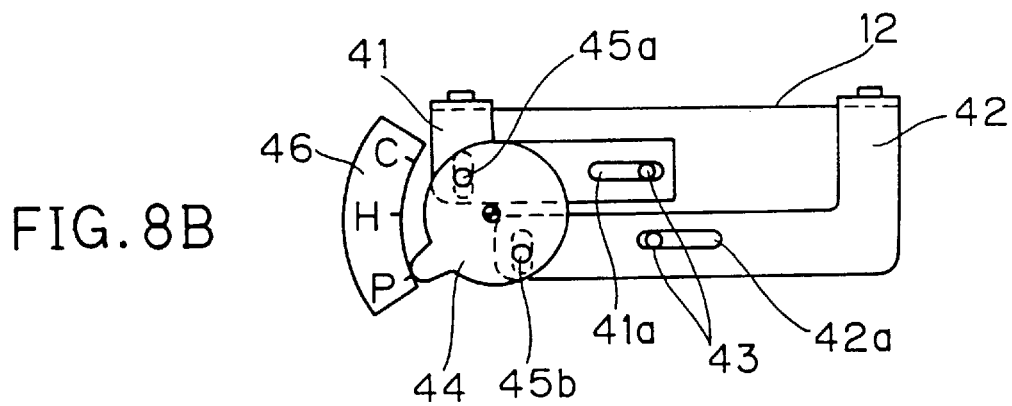
FIG. 8B is a front view of the driving mechanism of the field-of-view frame switching device of the first to third embodiments, when the P format is selected.
Figure 8C:
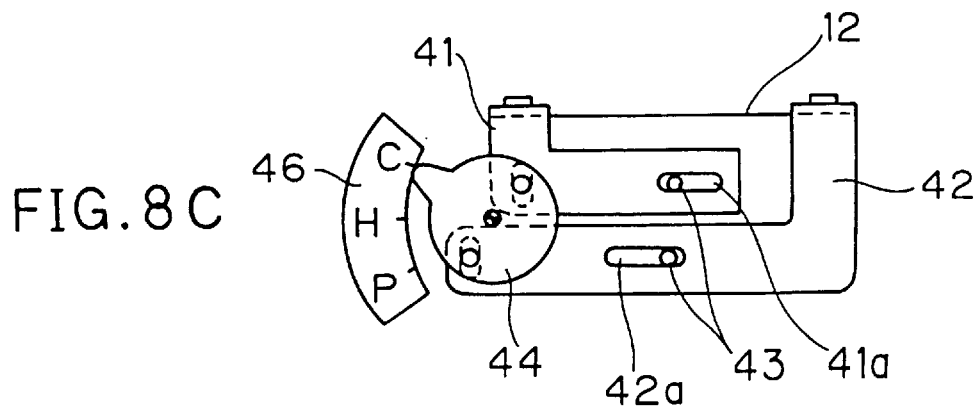
FIG. 8C is a front view of the driving mechanism of the field-of-view frame switching device of the first to third embodiments, when the C format is selected.

Next, the driving mechanism used to drive the movable mask in the first to third embodiments will be described with reference to FIGS. 8A to 8C. FIG. 8A is a perspective view illustrating the arrangement of the components of the driving mechanism 40 when the H format is selected, and FIGS. 8B and 8C are front views illustrating the arrangement of those components when the P and C formats, respectively, are selected. Note that, in these figures, such components as are found also in FIGS. 5A and 6A are identified with the same reference numerals.

In FIG. 8A, the movable mask 12 has its arm-like portions 23a rotatably fitted to the slide shafts 26, which are guided along the slide guide grooves 27 so as to be movable substantially parallel to the field-of-view determining edges 29 of the P light-shielding wings 21. The slide shafts 26 are fitted with slide levers 41 and 42, which have slide grooves 41a and 42a and operation grooves 41b and 42b formed therein.

Into the slide grooves 41a and 42a, slide guide bosses 43 are fitted so that the slide levers 41 and 42 are positioned appropriately in the direction perpendicular to the movable mask 12. Into the operation grooves 41b and 42b, bosses 45a and 45b formed on an operation lever 44 are fitted so that, as the operation lever 44 rotates about its center of rotation 44a, the slide levers 41 and 42 move in opposite directions as indicated by arrow J.

In this structure, when the user rotates the operation lever 44, which is disposed outside the camera body, to a position marked [P] on an indication plate 46 as shown in FIG. 8B, the slide levers 41 and 42 move in directions in which they recede from each other. As a result, the distance between the right-hand and left-hand C light-shielding wings 22a and 22b increases, and the distance between the upper and lower P light-shielding wings 21 decreases. In this way, the frame size is switched to the P format.

When the user rotates the operation lever 44 to a position marked [C] on the indication plate 46 as shown in FIG. 8C, the slide levers 41 and 42 move in directions in which they approach each other. As a result, the distance between the right-hand and left-hand C light-shielding wings 22a and 22b decreases, and thus the frame size is switched to the C format. At this time, the P light-shielding wings 21 are retracted out of the fixed field-of-view frame 11. It is also possible to switch the field-of-view frame by driving the slide levers 41 and 42 electrically by the use of a motor, a cam, and other components instead of the operation lever 44.

In this way, it is possible to select a field-of-view frame from three choices by the use of a simple driving mechanism 40 that drives the relevant members along only one axis and that therefore occupies a minimum of space. This helps make cameras compact.

Figure 9A:
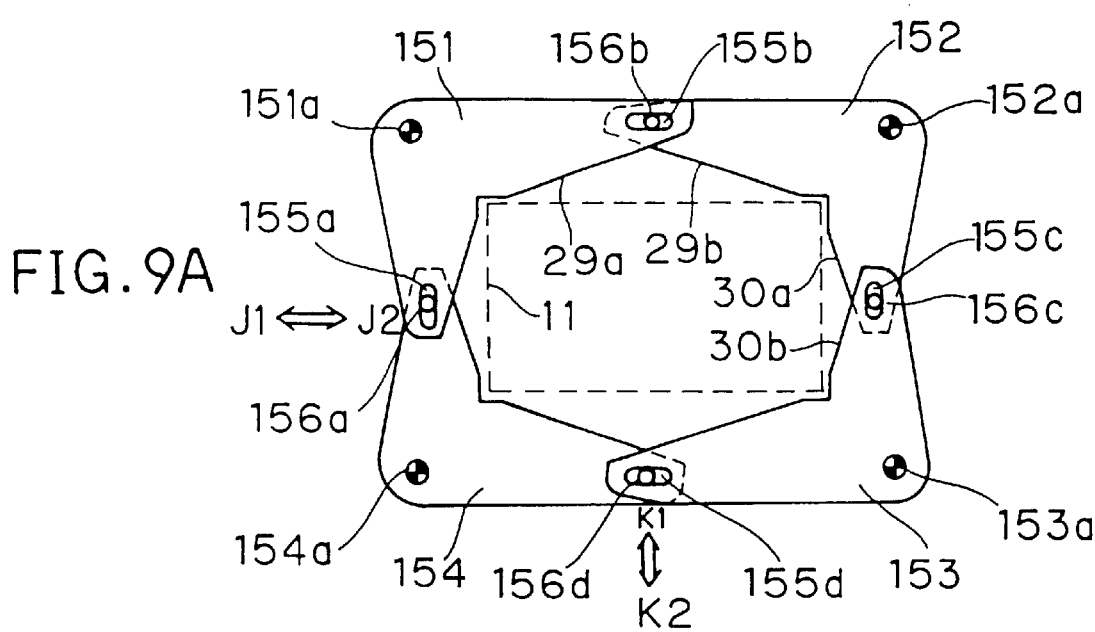
FIG. 9A is a diagram illustrating the arrangement of the light-shielding wings of the field-of-view frame switching device of a fourth embodiment of the invention, when the H format is selected.
Figure 9B:
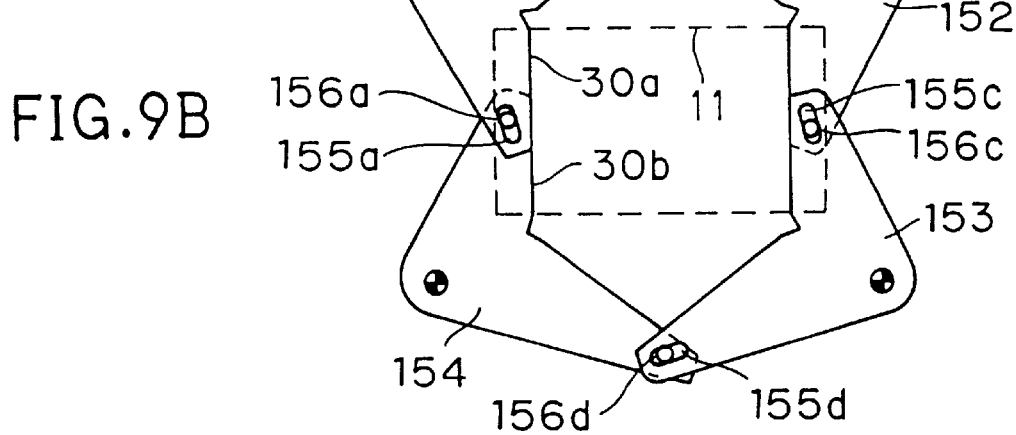
FIG. 9B is a diagram illustrating the arrangement of the light-shielding wings of the field-of-view frame switching device of the fourth embodiment, when the C format is selected.
Figure 9C:
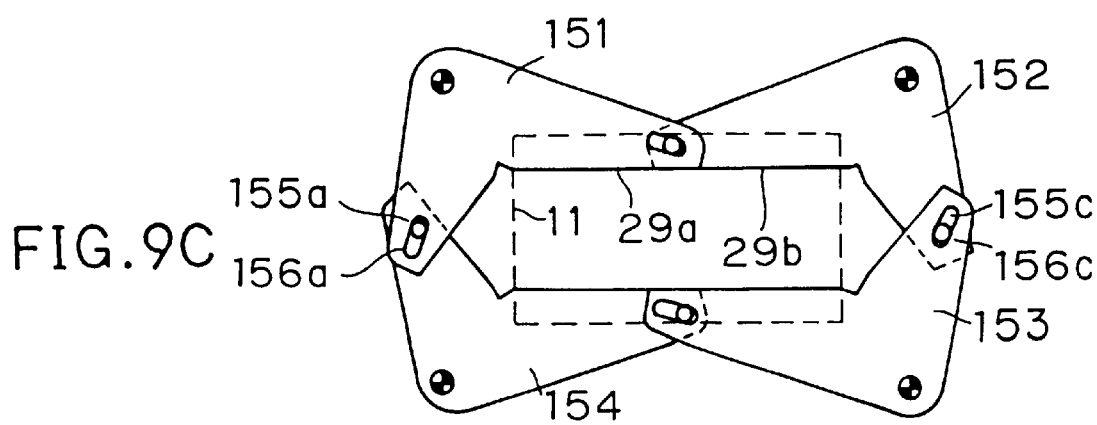
FIG. 9C is a diagram illustrating the arrangement of the light-shielding wings of the field-of-view frame switching device of the fourth embodiment, when the P format is selected.

Next, the field-of-view frame switching device of a fourth embodiment of the invention will be described with reference to the drawings. FIGS. 9A, 9B, and 9C show the arrangement of the movable mask 12 for the H, C, and P formats respectively. Note that, in these figures, such components as are found also in FIGS. 5A and 6A are identified with the same reference numerals.

As shown in FIG. 9A, the movable mask 12 includes four L-shaped light-shielding wings 151 to 154, of which two 151 and 153, arranged opposite each other, have pin guide grooves 155a to 155d formed therein and the other two 152 and 154, also arranged opposite each other, have coupling pins 156a to 156d formed thereon. These four light-shielding wings 151 to 154 are, substantially at the center of each side of the fixed field-of-view frame 11, coupled together by the coupling pins 156a to 156d fitted into the pin guide grooves 155a to 155d in such a way that each of the light-shielding wings 151 to 154 is rotatable about their respective center of rotation 151a to 154a.

Thus, this movable mask 12 has each of its four sides divided into two portions so that, as the distance between two opposite sides increases or decreases, the distance between the other two opposite sides decreases or increases. That is, when one of the coupling pins 156a to 156d is moved in a direction indicated by arrow J1, J2, K1, or K2, the light-shielding wings 151 to 154 each rotate about their respective center of rotation 151a to 154a as shown in FIGS. 9B and 9C. The pin guide grooves 155a to 155d guide the other three of the coupling pins 156a to 156d to move them along substantially straight axes until the field-of-view determining edges 30a and 30b or 29a and 29b form straight lines. In this way, the field-of-view frame is switched from the H format (FIG. 9A) to the C format (FIG. 9B) or to the P format (FIG. 9C).

Instead of coupling together the light-shielding wings 151 and 152 by the coupling pin 156b and coupling together the light-shielding wings 153 and 154 by the coupling pin 156d, it is also possible to use a driving mechanism like the one shown in FIG. 8A to drive the coupling pins 156a and 156c in opposite directions along one axis. Also this makes it possible to select a field-of-view frame from three choices. However, it is preferable to couple together the light-shielding wings 151 and 152, and the light-shielding wings 153 and 154, by the coupling pin 156b and 156d respectively, because it is then possible to switch the field-of-view frame simply by driving only one of the coupling pins 156a and 156c. This leads to further simplification of the driving mechanism.

Figure 10A:
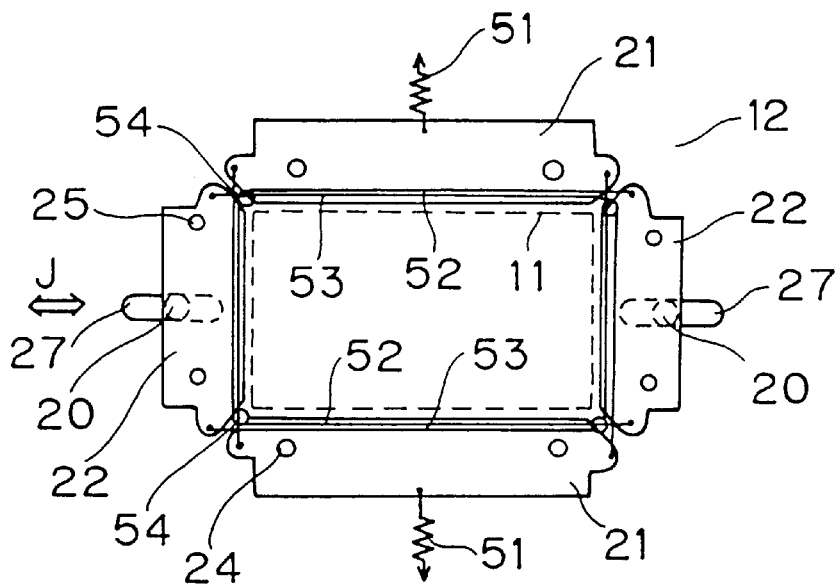
FIG. 10A is a diagram illustrating the arrangement of the light-shielding wings of the field-of-view frame switching device of a fifth embodiment of the invention, when the H format is selected.
Figure 10B:
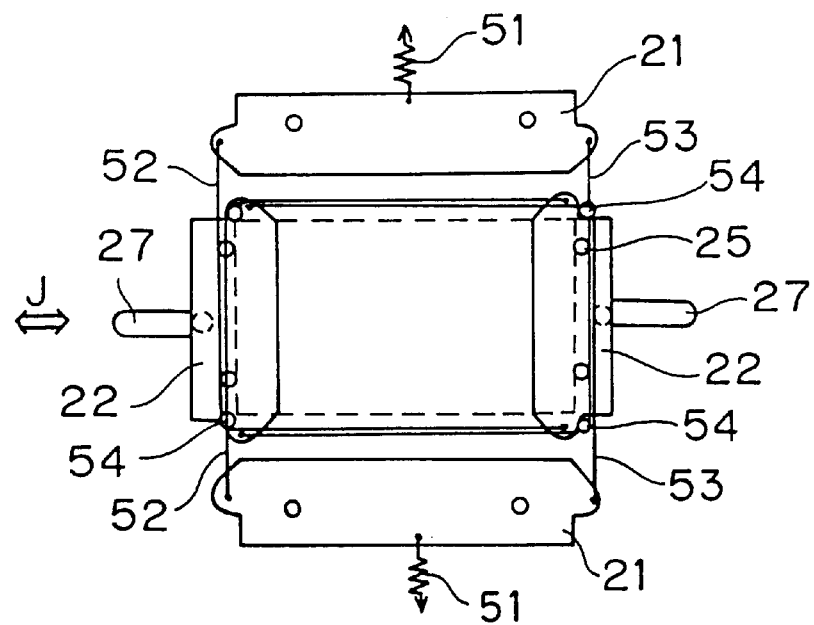
FIG. 10B is a diagram illustrating the arrangement of the light-shielding wings of the field-of-view frame switching device of the fifth embodiment, when the C format is selected.
Figure 10C:
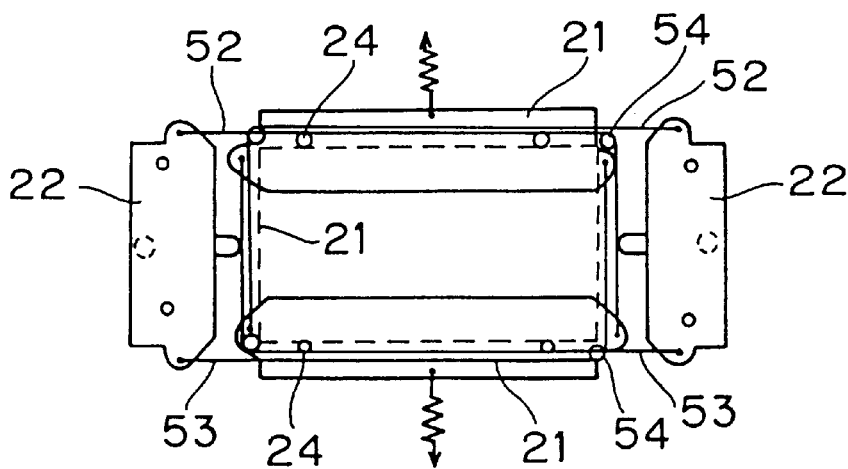
FIG. 10C is a diagram illustrating the arrangement of the light-shielding wings of the field-of-view frame switching device of the fifth embodiment, when the P format is selected.

Next, the field-of-view frame switching device of a fifth embodiment of the invention will be described with reference to the drawings. FIGS. 10A, 10B, and 10C show the arrangement of the movable mask 12 for the H, C, and P formats respectively. Note that, in these figures, such components as are found also in FIGS. 5A and 6A are identified with the same reference numerals.

As shown in FIG. 10A, the C light-shielding wings 22 each have a boss 20 formed thereon. The bosses 20 are guided along slide guide grooves 27 so that the C light-shielding wings 22 can move horizontally (as seen in the figures, as indicated by arrows J). The C light-shielding wings 22 are coupled to the P light-shielding wings 21 by wires 52 and 53. Moreover, the P light-shielding wings 21 are fitted with pull springs 51 so as to be pulled in directions in which they recede from each other.

The wires 52 and 53 change their direction by approximately 90° at guide pins 54. As a result, when the two oppositely arranged C light-shielding wings 22 are moved in directions in which they recede from each other, the P light-shielding wings 21, pulled by the wires 52 and 53, move in directions in which they approach each other. By contrast, when the two oppositely arranged C light-shielding wings 22 are moved in directions in which they approach each other, the P light-shielding wings 21, pulled by the pull springs 51, move in directions in which they recede from each other.

Figure 11:
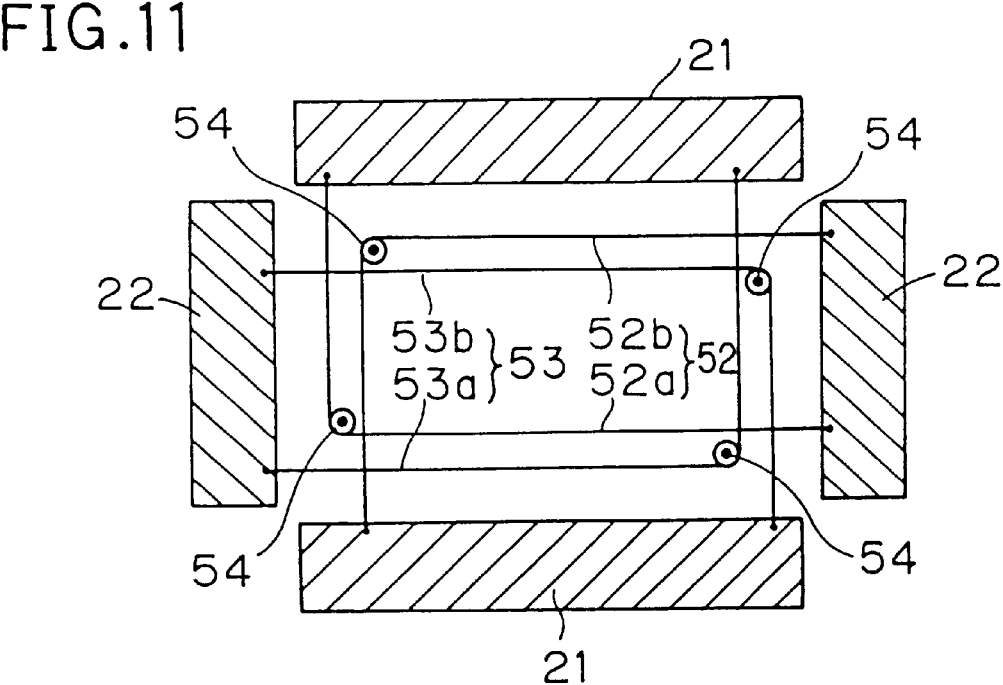
FIG. 11 is a diagram schematically illustrating how the light-shielding wings are coupled together in the field-of-view frame switching device of the fifth embodiment.

How the wires 52 and 53 are used to achieve desired coupling is schematically shown in FIG. 11. The wires 52 and 53 change their direction at the guide pins 54. Thus, the upper (as seen in the figure) P light-shielding wing 21 is kept at a predetermined distance from the C light-shielding wings 22 by the wires 52a and 53a. On the other hand, the lower (as seen in the figure) P light-shielding wing 21 is kept at a predetermined distance from the C light-shielding wings 22 by the wires 52b and 53b.

Having the structure as described above, the movable mask 12 appears as shown in FIG. 10A when the H format is selected. At this time, the bosses 20 are located substantially at the center of the slide guide grooves, and all of the P light-shielding wings 21 and the C light-shielding wings 22 are located outside the fixed field-of-view frame 11.

When the frame size is switched from the H format to the C format, as shown in FIG. 10B, the bosses 20 are moved, by a driving mechanism like the one shown in FIG. 8A, inward along the slide guide grooves 27, and thereby the C light-shielding wings 22 are moved horizontally inward until the stoppers 25 strike the fixed members (not shown) formed near the corresponding sides of the fixed field-of-view frame 11. At this time, the wires 52 and 53 tend to slacken, but this is prevented by the action of the pull springs 51, which pull the P light-shielding wings 21 and thereby retract them out of the fixed field-of-view frame 11.

When the frame size is switched from the H format to the P format, as shown in FIG. 10C, the bosses 20 are moved outward along the slide guide grooves 27, and thereby the C light-shielding wings 22 are moved horizontally outward. As a result, the P light-shielding wings 21, pulled by the wires 52 and 53, move vertically inward until the stoppers 24 strike the fixed members (not shown) formed near the corresponding sides of the fixed field-of-view frame 11. In this way, the field-of-view frame for the P format is determined.

In this way, by coupling together the P and C light-shielding wings 21 and 22 by wires 52 and 53, it is possible to select a field-of-view frame from three or more choices by the use of a driving mechanism that can drive the oppositely arranged C light-shielding wings in opposite directions substantially parallel to one side of the fixed field-of-view frame, with each of the C light-shielding wings driven at one point integral therewith. This can be achieved by the use of a simple driving mechanism and with a minimum of space secured to allow the movement of the light-shielding wings, and thus helps make cameras compact.

Figure 12:
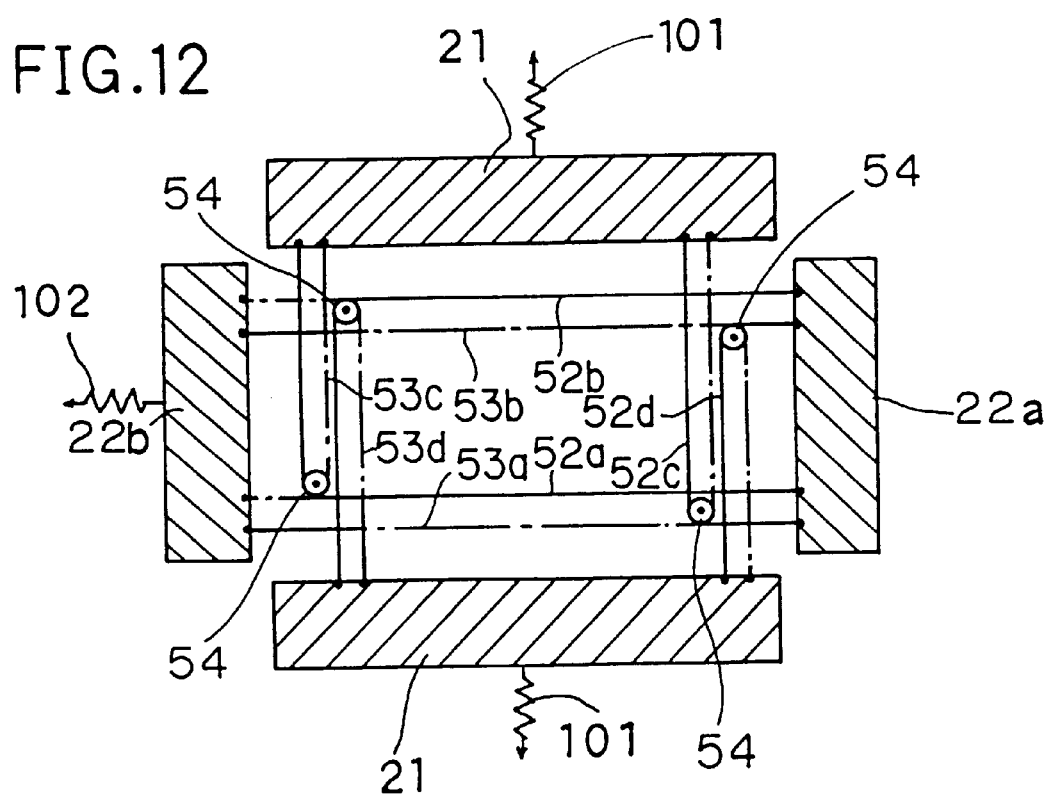
FIG. 12 is a diagram schematically illustrating how the light-shielding wings are coupled together in the field-of-view frame switching device of a sixth embodiment of the invention.

Alternatively, as shown in FIG. 12, which illustrates the field-of-view frame switching device of a sixth embodiment of the invention, the wires may be so arranged that each of the P light-shielding wings 21 is, at both ends, coupled to the two C light-shielding wings 22a and 22b. As shown in the figure, in this case, the right-hand C light-shielding wing 22a is coupled to the upper P light-shielding wing 21 by the wires 52a and 52c, and is coupled to the lower P light-shielding wing 21 by the wires 52b and 52d.

On the other hand, the left-hand C light-shielding wing 22b is coupled to the upper P light-shielding wing 21 by the wires 53a and 53c, and is coupled to the lower P light-shielding wing 21 by the wires 53b and 53d. The P light-shielding wings 21 and the C light-shielding wings 22b are each pulled outward by a spring 101 or 102.

In this structure, when the right-hand C light-shielding wing 22a is moved straight rightward (as seen in the figure), the upper and lower P light-shielding wings 21 move in directions in which they are pulled by the wires 52a to 52d. At this time, the wires 53a to 53d coupling the left-hand C light-shielding wing 22b to the P light-shielding wings 21 tend to slacken, but this is prevented by the action of the spring 102, which pulls the left-hand C light-shielding wing 22b outward and thereby causes the C light-shielding wings 22a and 22b to move in directions in which they recede from each other. In this way, the field-of-view frame for the P format is determined.

When the right-hand C light-shielding wing 22a is moved straight leftward (as seen in the figure), the P light-shielding wings 21 are moved vertically outward by the action of the spring 101, just as in the case shown in FIG. 10B. At this time, as long as the pulling force of the spring 102 is set to be weaker than that of the spring 101, this movement of the P light-shielding wings 21 causes the left-hand C light-shielding wing 22b to move horizontally inward. In this way, the field-of-view frame for the C format is determined.

In this way, it is possible to select a field-of-view frame from three or more choices by the use of a driving mechanism that can drive one point on the C light-shielding wing 22a along a straight line. This can be achieved with a simpler driving mechanism than in the fifth embodiment, and thus helps make cameras compact.

Figure 13:
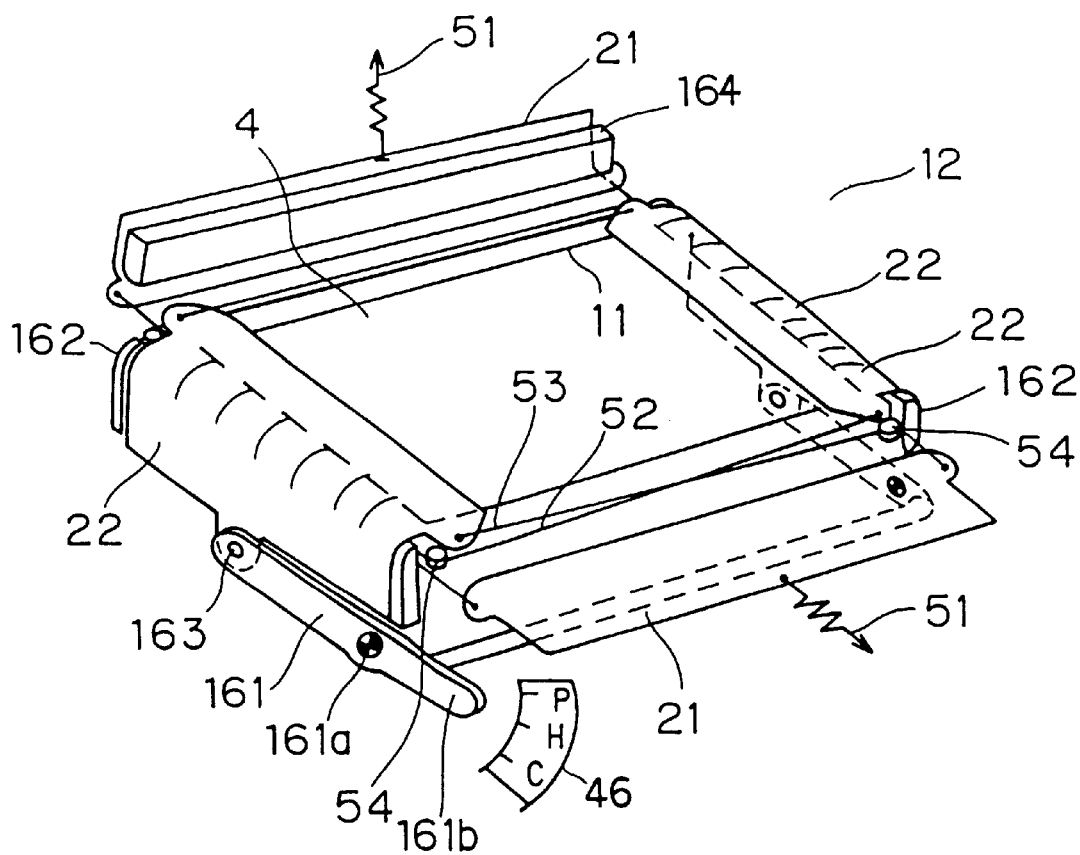
FIG. 13 is a perspective view of the field-of-view frame switching device of a seventh embodiment of the invention.

Next, the field-of-view frame switching device of a seventh embodiment of the invention will be described with reference to FIG. 13. Note that, in this figure, such components as are found also in FIG. 10 are identified with the same reference numerals. Here, the P light-shielding wings 21 and the C light-shielding wings 22 are made of a flexible material, and are so arranged as to be movable in directions perpendicular to the focusing plate 4 while changing their direction as they pass light-shielding wing guides 162 and 164 that are disposed just outside the fixed field-of-view frame 11. The P and C light-shielding wings 21 and 22 are coupled together by wires 52 and 53 that are arranged in the same manner as in the fifth or sixth embodiment.

At one end of each of the two oppositely arranged C light-shielding wings 22, a rotary lever 161 is fitted by the use of a coupling pin 163 so as to be rotatable about a center shaft 161a. One of the rotary levers 161 has an operation lever portion 161b formed integrally therewith.

In this structure, when the user rotates the operation lever portion 161b to a position marked [P], [H], or [C] on an indication plate 46, the P and C light-shielding wings 21 and 22 each move first straight parallel to the focusing plate 4 and then, outside the fixed field-of-view frame 11, in a direction perpendicular to the focusing plate 4, and thereby the respective field-of-view frame is determined. This structure is useful in cases where the space for the movement of the light-shielding wings 21 and 22 cannot be secured within substantially the same plane as the focusing plate 4, because it even then allows the light-shielding wings to be retracted three-dimensionally. This contributes to efficient use of available space.

Figure 14A:
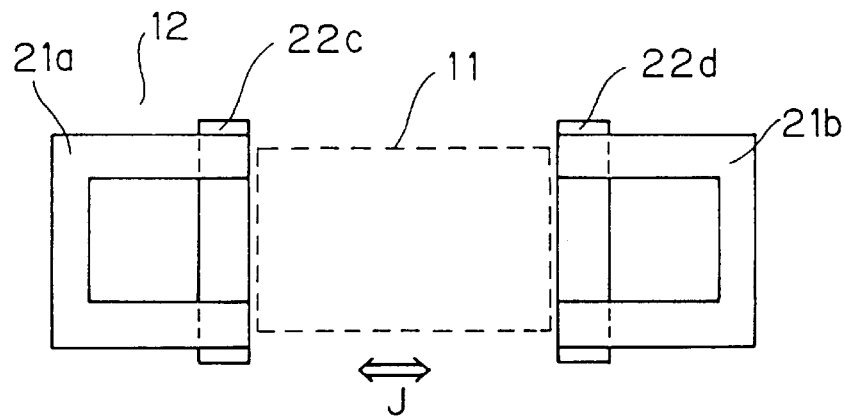
FIG. 14A is a diagram illustrating the arrangement of the light-shielding wings of the field-of-view frame switching device of an eighth embodiment of the invention, when the H format is selected.
Figure 14B:
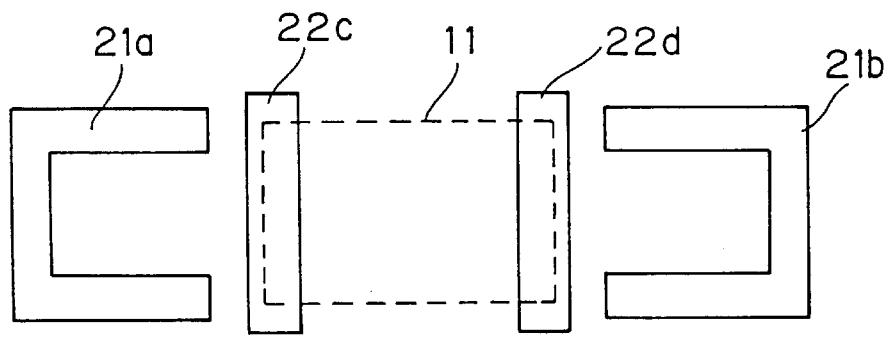
FIG. 14B is a diagram illustrating the arrangement of the light-shielding wings of the field-of-view frame switching device of the eighth embodiment, when the C format is selected.
Figure 14C:
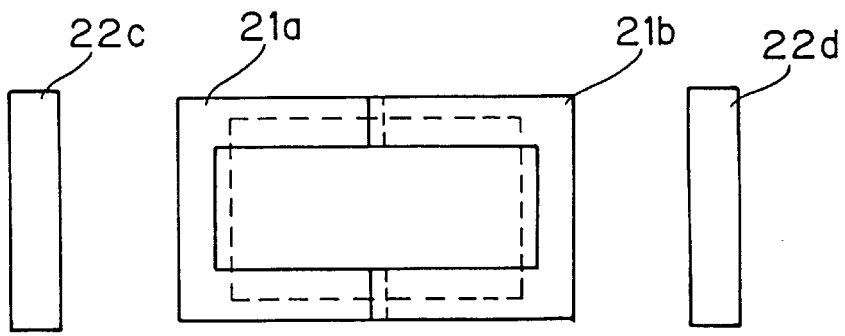
FIG. 14C is a diagram illustrating the arrangement of the light-shielding wings of the field-of-view frame switching device of the eighth embodiment, when the P format is selected.
Figure 15:
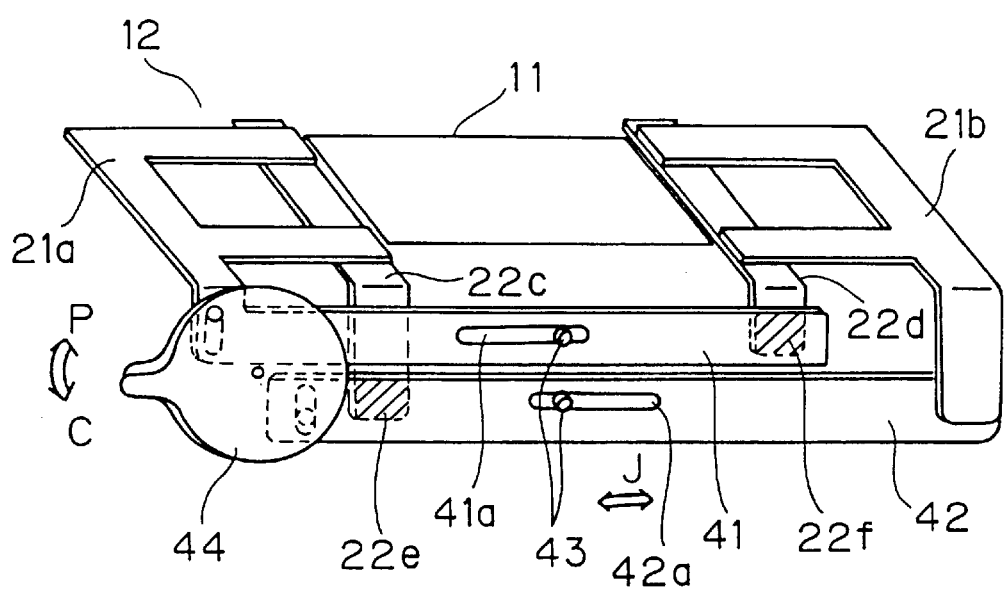
FIG. 15 is a perspective view illustrating the driving mechanism of the field-of-view frame switching device of the eighth embodiment.

Next, the field-of-view frame switching device of an eighth embodiment of the invention will be described with reference to the drawings. FIGS. 14A, 14B, and 14C show the arrangement of the movable mask 12 for the H, C, and P formats respectively. On the other hand, FIG. 15 shows the driving mechanism 40 used in the eighth embodiment. Note that, in these figures, such components as are found also in FIGS. 5A and 8A are identified with the same reference numerals.

As shown in FIG. 15, the movable mask 12 includes two C-shaped P light-shielding wings 21a and 21b that are disposed horizontally opposite each other and two I-shaped C light-shielding wings 22c and 22d that are also disposed horizontally opposite each other. Of these light-shielding wings, the left-hand P light-shielding wing 21a is coupled to the right-hand C light-shielding wing 22d by a slide lever 41, and the right-hand P light-shielding wing 21b is coupled to the left-hand C light-shielding wing 22c by another slide lever 42.

Just as in the case shown in FIG. 8A, when the user rotates the operation lever 44, the slide levers 41 and 42 move in opposite directions as indicated by arrows J, and this causes the P and C light-shielding wings 21a to 21d to move.

As shown in FIGS. 14A to 14C, in this structure, it is possible to select a field-of-view frame from three choices by moving the C light-shielding wings 22c and 22d, on the one hand, and the P light-shielding wings 21a and 21b, on the other hand, along the same axis (in the directions indicated by arrows J) by the use of a driving mechanism that can drive the relevant members along only one axis. Moreover, this structure requires no vertical (as shown in the figures) movement, and therefore it is possible to realize a field-of-view frame switching device that occupies almost no space above and below the field-of-view frame.

In this embodiment, it is also possible to form the P light-shielding wings 21a and 21b as one continuous component. However, retracting such a P light-shielding wing, which would then be horizontally twice as long as otherwise, out of the fixed field-of-view frame 11 requires not only an unduly large retraction space but also an unduly long movement stroke in one of the directions indicated by arrows J. Moreover, then, the C light-shielding wings (22c and 22d) coupled thereto also need to be moved through an accordingly long movement stroke and thus require an unduly large retraction space. By contrast, by the use of the horizontally (as seen in the figure) divided P light-shielding wings 21a and 21b, it is possible to realize a field-of-view frame switching device that requires a minimum of space to the right and to the left of the field-of-view frame.

Figure 16A:
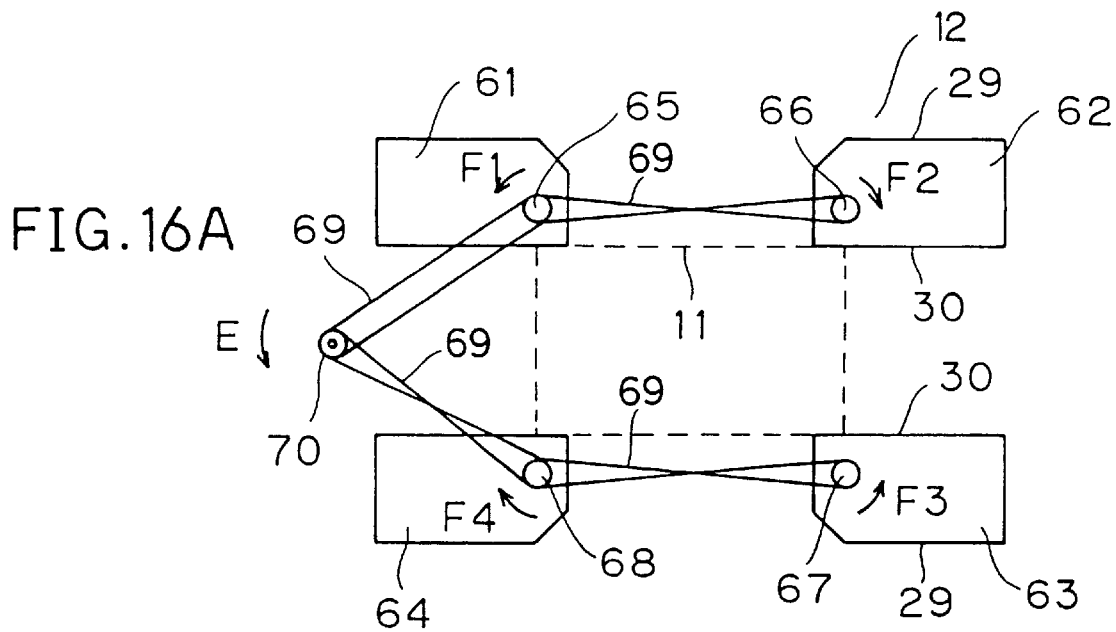
FIG. 16A is a diagram illustrating the arrangement of the light-shielding wings of the field-of-view frame switching device of a ninth embodiment of the invention, when the H format is selected.
Figure 16B:
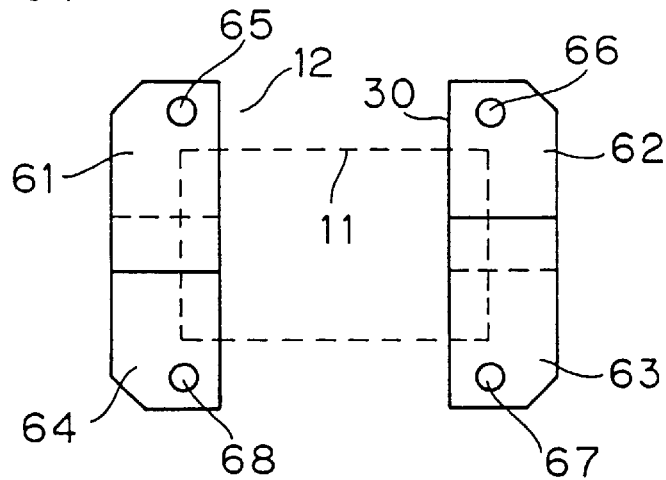
FIG. 16B is a diagram illustrating the arrangement of the light-shielding wings of the field-of-view frame switching device of the ninth embodiment, when the C format is selected.
Figure 16C:
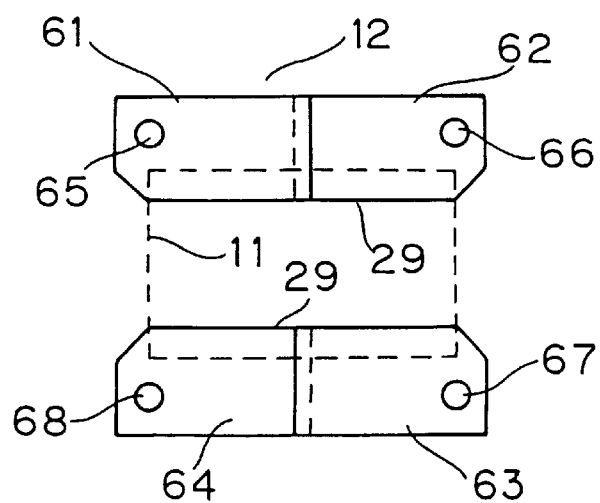
FIG. 16C is a diagram illustrating the arrangement of the light-shielding wings of the field-of-view frame switching device of the ninth embodiment, when the P format is selected.

Next, the field-of-view frame switching device of a ninth embodiment of the invention will be described with reference to the drawings. FIGS. 16A, 16B, and 16C show the arrangement of the movable mask 12 for the H, C, and P formats respectively.

As shown in FIG. 16A, the movable mask 12 includes four light-shielding wings 61 to 64, which are all designed to be rotatable about and together with their respective rotary shafts 65 to 68. These four rotary shafts 65 to 68 are coupled to a driving shaft 70 by belts 69. As a result, when the drive shaft 70 is rotated in the direction indicated by arrow E, the rotary shafts 65 to 68, together with the light-shielding wings 61 to 64, rotate in the directions indicated by arrows F1 to F4 respectively, and thereby the field-of-view frame is switched to that for the C format as shown in FIG. 16B. Thereafter, when the drive shaft 70 is rotated further in the direction indicated by arrow E, the field-of-view frame is switched to that for the P format as shown in FIG. 16C.

Also in this structure, dividing the movable mask into four light-shielding wings 61 to 64 and rotating in different directions these light-shielding wings thus divided at the center of each side of the movable mask helps reduce the retraction space for the light-shielding wings 61 to 64. In addition, this structure requires a driving mechanism that can simply rotate a target member about one point (i.e. the driving shaft 70), and thus helps reduce the space occupied by the driving system.

In the field-of-view frame switching devices described heretofore, according as the distance between two opposite light-shielding wings is increased or reduced, the distance between the other two opposite light-shielding wings is reduced or increased. Thus, by driving one point on one of these light-shielding wings in a direction substantially perpendicular to one side of the fixed field-of-view frame, it is possible to select one among a plurality of field-of-view frames. This helps simplify the driving mechanism, minimize the space occupied by the driving mechanism, and minimize the retraction space for the light-shielding wings.

Moreover, by appropriately coupling together the light-shielding wings that are disposed along the four sides of the movable mask, it is possible to increase or decrease the distance between two opposite light-shielding wings while decreasing or increasing the distance between the other two opposite light-shielding wings. Thus, by driving one point on one of these light-shielding wings in a direction substantially perpendicular to one side of the fixed field-of-view frame, it is possible to select one among a plurality of field-of-view frames. This helps simplify the driving mechanism, minimize the space occupied by the driving mechanism, and minimize the retraction space for the light-shielding wings.

Moreover, when at least one of the light-shielding wings that are disposed along the four sides of the movable mask is divided into two portions, it is possible, simply by moving the thus divided light-shielding wing portions in opposite directions, to select one among a plurality of field-of-view frames accurately and smoothly. This is achieved by the use of a driving mechanism that can simply rotate a target member about one point or move it straight along one axis, and thus helps simplify the driving mechanism, minimize the space occupied by the driving mechanism, and minimize the retraction space for the light-shielding wings.

Figure 17:
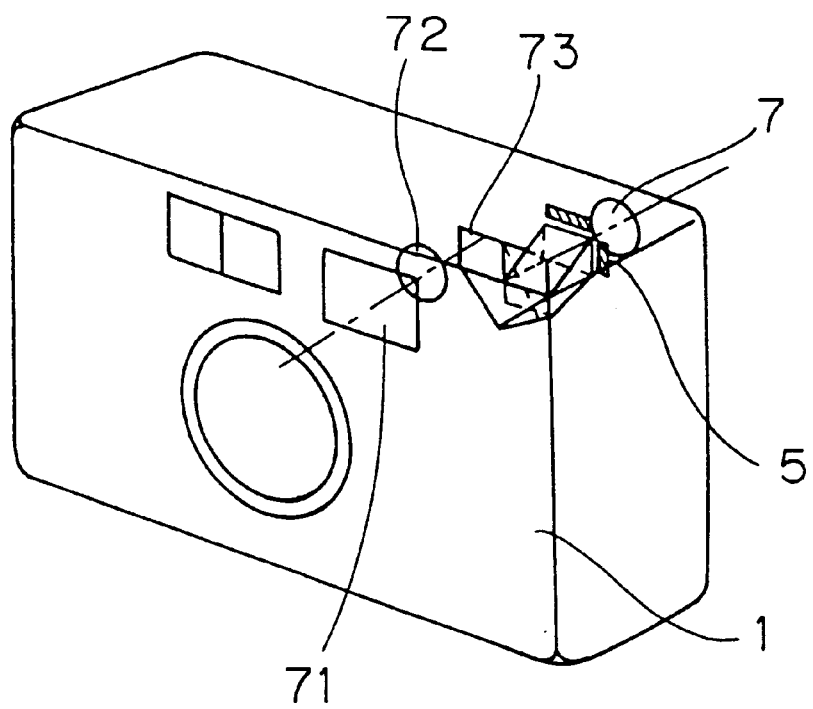
FIG. 17 is a perspective view of a lens-shutter camera incorporating a field-of-view frame switching device embodying the invention.

The above descriptions deal only with cases where the field-of-view frame switching device is incorporated into a single-lens-reflex camera. However, the field-of-view frame switching devices of the above embodiments can be used also in LS cameras as shown in FIG. 17. In this case, the field-of-view frame switching unit 5 is disposed in a position within a camera where the light beam coming from the object forms an image. In cameras that employ a relay lens system, the field-of-view frame switching unit 5 may be disposed on the secondary imaging plane.

The field-of-view frame switching devices of the embodiments may be used even in apparatuses other than cameras, for example slide projectors, to switch between a plurality of rectangular field-of-view frames. In FIG. 17, reference numeral 72 represents an objective lens, reference numeral 73 represents a Porro prism, and reference numeral 7 represents an eyepiece lens.

What is claimed is:

1. A field-of-view frame switching device comprising:
   a rectangular fixed field-of-view frame of a predetermined size;
   a mask for providing an actual field-of-view frame having a variable size, wherein the actual field-of-view frame establishes an actual field-of-view frame size being used in the field-of-view frame switching device, the mask being composed of:
   a plurality of light-shielding members for covering portions of said rectangular fixed field-of-view frame so as to vary the actual field-of-view frame size, said light-shielding members comprising a first pair of oppositely arranged light-shielding members and a second pair of oppositely arranged light-shielding members; and
   a plurality of coupling members for coupling the first pair of light-shielding members to the second pair of light-shielding members, wherein
   said first and second pairs of light-shield members are all moved simultaneously, and
   when said first pair of light-shielding members are positioned closer to each other to narrow the actual field-of-view frame, said second pair of light-shielding members are positioned wider apart from each other than a second pair original set position at which said second pair of light-shielding members do not narrow the actual field-of-view simultaneously with the positioning of the first pair of light-shield member, and when said first pair of light-shielding members are positioned wider apart from each other than a first pair original set position at which said first pair of light-shielding members do not narrow the actual field-of-view, said second pair of light-shielding members are positioned closer to each other to narrow the actual field-of-view frame simultaneously with the positioning of the first pair of light-shield member; and
   a moving member for moving at least one lighting-shielding member of said plurality of light-shielding members in a direction substantially parallel to one side of said rectangular fixed field-of-view frame.

2. A field-of-view frame switching device as claimed in claim 1, wherein said plurality of coupling members couples said light-shielding members together by use of a flexible material, and wherein a flexing operation of said flexible material causes the second pair of light-shielding members to be positioned wider apart from each other than the second original set position when the first pair of light-shielding members are positioned closer to each other, and causes the first pair of light-shielding members to be positioned wider apart from each other than the first pair original set position when the second pair of light-shielding members are positioned closer to each other.

3. A field-of-view frame switching device as claimed in claim 1,
   wherein said coupling member couples said light-shielding members together by use of wires, and wherein members for changing directions of said wires are provided somewhere along paths of said wires, and wherein the coupling members in the second pair are moved closer to each other when the coupling members in the first pair are positioned wider apart from each other than the first pair original set position by being pulled by said wires, and the coupling members in the first pair are moved closer to each other when the coupling members in the second pair are positioned wider apart from each other than the second pair original set position by being pulled by said wires.

4. A field-of-view frame switching device comprising:

a rectangular fixed field-of-view frame of a predetermined size; and a mask having a single mask opening that can be varied in size to provide an actual field-of-view frame used in the field-of-view frame switching device, the mask being a unitary structure composed of:
   a plurality of field-of-view frame switching members for covering portions along top, bottom, left-hand, and right-hand sides of said rectangular fixed field-of-view frame, said plurality of switching members of said single mask opening be movable in a plurality of directions so as to vary the actual field-of-view frame size of said single mask opening; and
   a plurality of coupling members integrally formed in the mask for coupling said field-of-view frame switching members together into a unitary structure, wherein said plurality of coupling members are made of a flexible material.

5. A field-of-view frame switching device as claimed in claim 4, further comprising:

a moving member for moving at least one field-of-view frame switching member of said plurality of field-of-view frame switching members in a predetermined direction.

6. A field-of-view frame switching device as claimed in claim 5, wherein said predetermined direction is a direction substantially parallel to one side of said fixed field-of-view frame.

7. A field-of-view frame switching device comprising:

a rectangular fixed field-of-view frame of a predetermined size; and a mask for providing an actual field-of-view frame having a variable size wherein the actual field-of-view frame establishes an actual field-of-view frame size being used in the field-of-view frame switching device, the mask being a unitary structure composed of:
   a plurality of field-of-view frame switching members for covering portions along top, bottom, left-hand, and right-hand sides of said rectangular fixed field-of-view frame so as to vary the actual field-of-view frame size; and
   a plurality of coupling members integrally formed in the mask for coupling said field-of-view frame switching members together into a unitary structure, wherein said plurality of coupling members are made of a flexible material, wherein adjacent field-of-view frame switching members of said plurality of field-of-view frame switching members move relative to each other as a result of a flexing operation of said flexible material.

8. A field-of-view frame switching device comprising:

a rectangular fixed field-of-view frame having a predetermined size;

a field-of-view frame switching unit for covering portions of said fixed field-of-view frame so as to establish an actual field-of-view frame having a variable size, said actual field-of-frame of view being used in the field-of-view frame switching device, said field-of-view frame switching unit having:
   a plurality of sides, at least at one side thereof being divided, said at least one divided side of said field-of-view frame switching unit being operable to covers at least one side of the fixed field-of-view frame respectively; and
   a plurality of flexible coupling members connecting adjacent sides of said plurality of sides; and a moving member for moving at least one side of said field-of-view frame switching unit in a direction substantially parallel to one side of said rectangular fixed field-of-view frame, wherein adjacent sides of said field-of-view frame switching unit move relative to each other as a result of a flexing operation of said flexible coupling member, and said moving member moves said at least one divided side.

9. A field-of-view frame switching device as claimed in claim 8, wherein said moving member moves divided portions of said at least one divided side of said field-of-view frame switching unit in different directions.

10. A field-of-view frame switching device as claimed in claim 8, wherein divided sides of said field-of-view frame switching unit are coupled by a member made of a flexible material to undivided sides of said field-of-view frame switching unit which are adjacent to the divided sides.

11. A field-of-view frame switching device as claimed in claim 8, wherein said field-of-view frame switching unit has two divided sides which are opposite of each other.

12. A field-of-view frame switching device as claimed in claim 11, wherein the divided sides of said field-of-view frame switching unit move in the same direction as undivided sides of said field-of-view frame switching unit.

13. A field-of-view frame switching device as claimed in claim 8, wherein said field-of-view frame switching unit serves also as a light-shielding member.

14. A field-of-view frame switching device comprising:

a rectangular fixed field-of-view frame having a predetermined size;

a mask for providing an actual field-of-view frame having a variable size, wherein the actual field-of-view frame establishes an actual field-of-view frame size being used in the field-of-view frame switching device, the mask being composed of:
   a plurality of field-of-view frame switching members, provided so as to correspond individually to four sides of the rectangular fixed field-of-view frame, for varying a size of the actual field-of-view frame by covering the rectangular fixed field-of-view frame,
   wherein the field-of-view frame switching members cover one of the four sides of the rectangular fixed field-of-view frame with two field-of-view frame switching members.

15. The field-of-view frame switching device as claimed in claim 14, further comprising a moving member for rotating said two field-of-view frame switching members that cover said at least one of the four sides of the rectangular fixed field-of-view frame.

* * * * *